United States Patent
Lipawsky

(10) Patent No.: US 7,452,069 B2
(45) Date of Patent: Nov. 18, 2008

(54) EYEFRAME WITH INTERCHANGEABLE LENSPIECES HELD BY MAGNETIC CLOSURE AND INTERCHANGEABLE LENS SYSTEM

(76) Inventor: Steven R. Lipawsky, 4151 NW. 124th Ave., Coral Springs, FL (US) 33065-7633

( * ) Notice: Subject to any disclaimer, the term of this patent is extended or adjusted under 35 U.S.C. 154(b) by 352 days.

(21) Appl. No.: 11/324,465

(22) Filed: Jan. 3, 2006

(65) Prior Publication Data

US 2006/0256280 A1 Nov. 16, 2006

Related U.S. Application Data

(60) Provisional application No. 60/680,238, filed on May 12, 2005.

(51) Int. Cl.
*G02C 9/00* (2006.01)

(52) U.S. Cl. .......................... 351/47; 351/57

(58) Field of Classification Search .................. 351/47, 351/57, 48, 58, 44, 41, 158, 124
See application file for complete search history.

(56) References Cited

U.S. PATENT DOCUMENTS

| | | | |
|---|---|---|---|
| 2,738,709 A | 3/1956 | Matthews et al. | |
| 4,176,921 A | 12/1979 | Matthias | |
| 4,523,819 A | 6/1985 | Dianitsch et al. | |
| 4,759,622 A | 7/1988 | Schmidthaler | |
| 4,822,158 A | 4/1989 | Porsche | |
| 4,834,523 A | 5/1989 | Porsche | |
| 5,048,944 A | 9/1991 | Porsche | |
| 6,283,591 B1 | 9/2001 | Chen | |
| 6,352,342 B1 | 3/2002 | Huang | |
| 6,478,420 B2 | 11/2002 | Xiang | |
| 6,604,822 B1 | 8/2003 | Chen | |
| 6,637,878 B2 | 10/2003 | Huang | |
| 6,705,721 B1 * | 3/2004 | Chen | 351/47 |
| 6,789,893 B1 | 9/2004 | Hong | |
| 6,866,385 B2 | 3/2005 | Madison | |
| 6,869,179 B2 | 3/2005 | Friedman | |
| 6,869,180 B1 | 3/2005 | Kidouchim | |
| 7,244,023 B1 * | 7/2007 | Hsiao | 351/57 |
| 2005/0052613 A1 | 3/2005 | Kidouchim | |

OTHER PUBLICATIONS

Serway, Physics: For Scientists and Engineers with Modern Physics, 1990, pp. 835-873, 3d ed, Saunders College Publishing, Philadelphia, US.

* cited by examiner

*Primary Examiner*—Hung X Dang
(74) *Attorney, Agent, or Firm*—Loren Pearson; Fleit Gibbons Gutman Bongini & Bianco PL

(57) ABSTRACT

An eyeframe uses a magnetic closure to attach a variety of interchangeable lenspieces to the eyeframe. The magnetic closure allows the wearer to interchange lenses depending on the circumstance. Furthermore, the magnetic closure securely closes but does not wear with use or require so much force that could lead to damaging the lenses and/or closure.

32 Claims, 4 Drawing Sheets

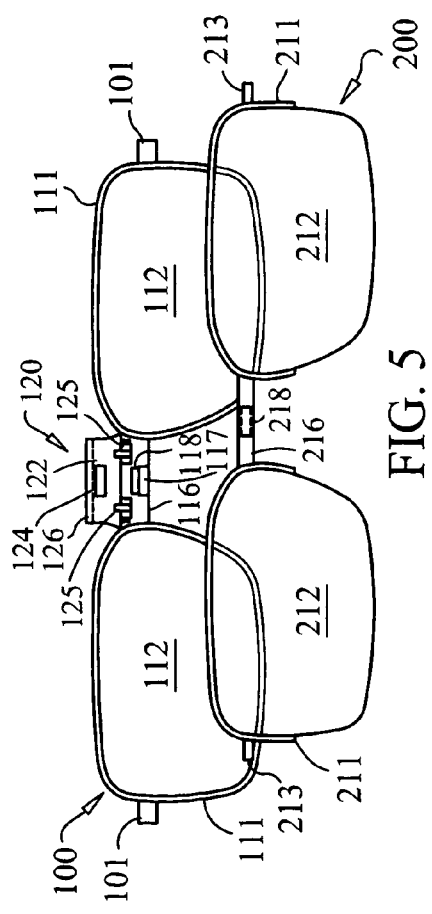
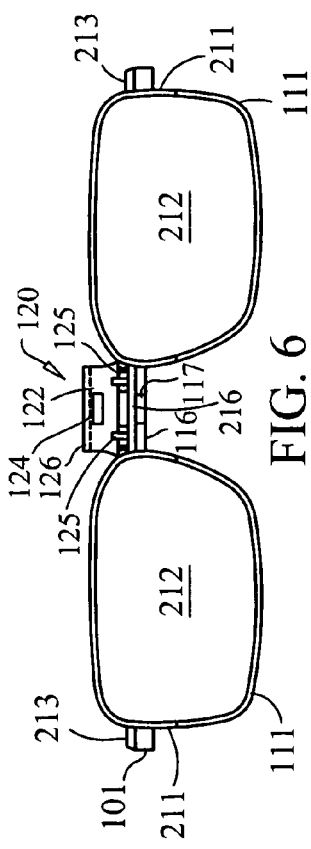
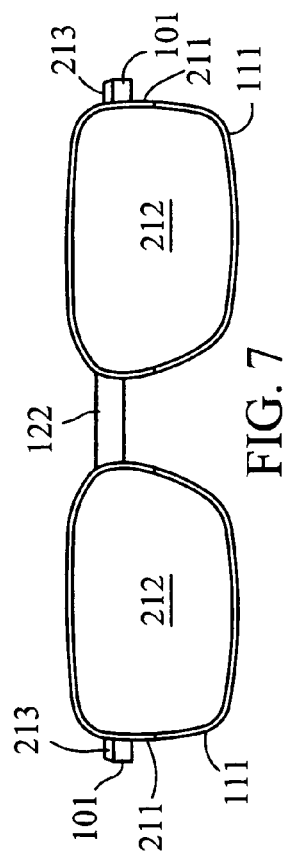
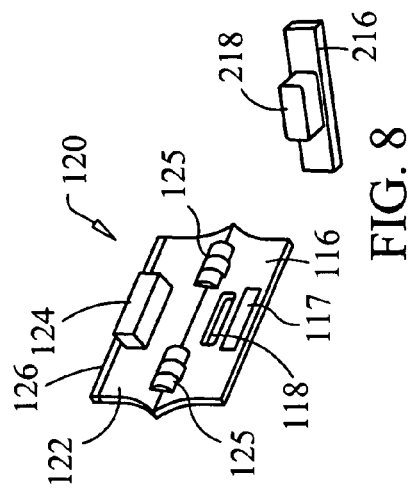
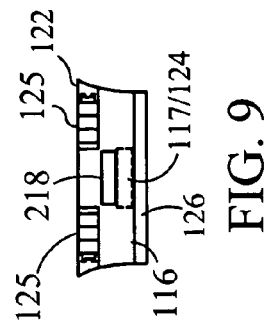

EYEFRAME WITH INTERCHANGEABLE LENSPIECES HELD BY MAGNETIC CLOSURE AND INTERCHANGEABLE LENS SYSTEM

CROSS-REFERENCE TO RELATED APPLICATION

This application claims the benefit of U.S. Provisional Application No. 60/680,238, filed May 12, 2005.

BACKGROUND OF THE INVENTION

1. Field of the Invention

The invention relates to eyeglasses with interchangeable lenses.

2. Description of the Related Art

Eyeglasses having exchangeable lenses or lens assemblies offer several advantages over conventional eyeglasses having fixed lenses. For example, in the case of sunglasses, different pairs of lenses can be provided for varying light conditions. Examples of these lenses are preferably polarized to protect the eyes against ultraviolet rays and reduce glare. In the case of prescription glasses, lenses manufactured to the current prescription of the wearer can be easily exchanged for the out-of-date prescription lenses. Also, in the case of lens and/or frame damage, a single component can be replaced more economically than purchasing an entirely new pair of eyeglasses.

Exchangeable lens eyeglasses have been known for some time but older configurations have had significant shortcomings in that they are generally mechanically complex, making them expensive to manufacture. Other configurations require substantial mutual deformation of the lens and the front component of the frame making insertion and removal of a lens cumbersome and difficult.

Recently introduced exchangeable eyeglass designs have overcome these shortcomings by making replacement of the lenses convenient. In one structure disclosed in U.S. Pat. No. 4,176,921, the eyeglass front is disclosed as being made of wire with complete rims (rims completely encompassing the lenses). Soldered to the wire rims are two spaced lower prongs for supporting each lens. An additional prong extends adjacent the temple piece, and is either integral with the rim, or is secured in another soldered joint. The lenses, which are stored without a frame until ready for use, are inserted from above until they are embraced by the prongs. A metal lever is hinged to the bridge joining the rims and carries a prong for each lens. The lever is rotated downwardly to a holding position, to prevent upward movement of the lenses. Separate plastic nose pads are attached to the wire front. The eyeglasses shown in this patent have met with widespread success but they are relatively expensive due to the complete wire front, which is typically formed of a wire stock, and must be soldered in a separate manufacturing step to form a closed loop. Also, a complete wire rim is limited in its ability to accommodate designer materials and colors.

Complete wire rims, especially those for mating with exchangeable lenses can present a problem in that the wire rims are susceptible to bending or other deformation, which destroys the relatively close-tolerance lens-conforming configuration. Also, the lenses themselves are unsupported during storage. Plastic and polycarbonate lenses may tend to warp if stored under conditions of excessive heat or pressure and can also scratch relatively easily.

An eyeglass configuration for a front assembly having partial rims (rims which extend about the periphery of typically only the upper or lower portion of the lenses) is disclosed in U.S. Pat. No. 4,523,819. The eyeglass front includes wires or threads that are received in grooves in the exposed bottom edges of the lenses. The threads are fastened to one end of their associated partial rim and meet at the bridge section of the front where their remaining ends are held by the free ends of pivotal levers for tensioning the threads. A retainer clip, which is hinged to a lower bridge member, overlies the lever free ends to maintain the levers in their tensioning positions. The front used in the eyeglasses is preferably formed of metal to accommodate the wear occasioned by the use of pivoting components, to permit the attachment of prongs, and to provide adequate strength for tensioning. While generally satisfactory, the eyeglasses shown in this patent present some difficulties for wearers who have limited manual dexterity or who are engaged in outdoor winter sports or other activities requiring gloves.

Another embodiment of an interchangeable eyeglass configuration is shown in U.S. Pat. No. 2,738,709. An eyeglass frame made of wire is provided for mounting two lenses, and includes an intermediate metal bridge portion. The wire frame is adapted to be received behind an overlying plastic frame containing the customary temple pieces for engaging the temples and ears of a wearer. Both the wire frame and the overlying plastic frame have complete rims that completely encircle the lenses. Recesses are provided in the rear of the overlying plastic frame (adjacent the wearer's face), to receive the entire rim portions of the wire frame. Two hingeable latches are provided on the overlying plastic frame adjacent the temple pieces to secure the wire frame thereto. This interchangeable eyeglass configuration has considerable mass (i.e. bulk) and is therefore relatively heavy. The overlying plastic frame must be sufficiently bulky at its bridge and rim portions to hide or mask the underlying wire frame, and the front of the overlying plastic frame has enlarged bulk adjacent its temple portions to accommodate the separately formed hingeable latches. This configuration relies on frictional engagement between the wire and plastic bridges, which are susceptible to wear over years of use. To compensate for this wear, the temple pieces can be adjusted to increase pressure on the wearer's ear, thereby pressing the bridge portions together, but this may be uncomfortable over extended wearing times.

Eyeglasses with interchangeable lenses are known in the prior art. Examples include U.S. Pat. Nos. 4,759,622, 4,822,158, and 4,834,523. These patents use mechanical closures or clasps to lock the lenses in place. The mechanical clasp wears with usage. Eventually mechanical clasps wear to the point of not locking. This leads to the interchangeable lens not being locked in the eyeglasses allowing it to unintentionally fall out.

Another problem with mechanical claps is that they require physical force to lock and unlock them. For a secure hold, the amount of force may be enough to crack or chip the lens if the force is accidentally transferred to the lens. Accordingly, a clumsy effort to lock or unlock the bridge could lead to enough force to damage the lens to be brought onto lens.

Kidouchim, US. Patent Application No. US 2005/0052613, and Kidouchim, U.S. Pat. No. 6,869,180, show a system for attaching auxiliary lenses to an eyeframe that includes customary, non-removable primary lenses. A hinge is included to pivot the auxiliary lens into and out of position with the primary lens. The hinge does not release the primary lens. While a magnet is included to hold the auxiliary lenses in different positions 68 and 70, the application does not teach to use the magnet to lock a bridge closed so as to prevent the primary lenses from accidentally falling from the eyeframe.

In U.S. Pat. No. 6,789,893, Hong discloses a magnetically attached auxiliary lens system. The auxiliary lenses swivel on a hinge. The magnets are used to attach the support to the eyeframe not to lock the lenses in position.

In U.S. Pat. No. 6,637,878, Huang teaches a pivoting auxiliary lens system that is attached magnetically to a pair of eyeglasses. Huang does not show a hinged bridge that magnetically closes to hold a set of interchangeable primary lenses.

In U.S. Pat. Nos. 6,604,822 and 6,283,591, Chen teaches a pivoting auxiliary lens that attaches magnetically to a pair of eyeglasses. Chen does not show a hinged bridge that magnetically closes to hold a primary set of interchangeable lenses.

In U.S. Pat. No. 6,352,342, Huang teaches a pivoting auxiliary lens that attaches magnetically to a pair of eyeglasses. Huang does not show a hinged bridge that magnetically closes to hold a primary set of interchangeable lenses.

In U.S. Pat. No. 5,048,944, Porsche teaches eyeglasses with interchangeable primary lenses. The eyeglasses include a rimwire, a nose bridge, and a hinged closure. The retaining clip closes mechanically by snapping into place. The mechanical closure is subject to wear and, as the retaining clip become permanently deformed, the retaining clip will fail to retain the lenses.

In U.S. Pat. No. 4,176,921, Matthias teaches eyeglasses with interchangeable primary lenses. The eyeglasses include a rimwire, a nose bridge, and a hinged closure. The retaining clip closes mechanically by snapping into place. The mechanical closure is subject to wear and, as the retaining clip become permanently deformed, the retaining clip will fail to retain the lenses.

In U.S. Pat. No. 6,869,179, Friedman teaches a mechanical clip for attaching an auxiliary lens to eyeglasses. In U.S. Pat. No. 6,866,384, Madison teaches a magnetic attachment for auxiliary lenses to primary eyeglasses. In U.S. Pat. No. 6,478, 420, Xiang teaches magnetic attachments that allow rimless auxiliary lenses to be attached to rimless primary lenses.

In U.S. Pat. No. 4,523,819, Dianitsch et al. improve the Porsche design and adds a ratcheted wire partially around the perimeter of the lenses to secure them.

In U.S. Patent No. Porsche U.S. Pat. No. 4,834,523, Porsche teaches collapsible eyewear with interchangeable primary lenses. Each lens has a plurality of notches that hold the lenses. The frame opens at a hinge at the stem.

In U.S. Pat. No. 4,822,158, Porsche teaches an interchangeable primary lens that attaches to a frame by a hinged bridge that mechanically closes. Porsche '158 does not teach a magnetic closure on the bridge.

In U.S. Pat. No. 4,759,622, Scmidthaler teaches a mechanical snapping bridge piece that releases interchangeable primary lenses. The bridge piece is not hinged. No magnetic closure is taught-just a snap.

Prior-art examples that include magnets fail to hide the magnets. That is, the magnets that attach auxiliary lenses are visible. These magnets, when visible, disturb the aesthetic norm of eyeglass frames that typically have no magnets visible. Accordingly, a need exists for eyeframes with interchangeable lenspieces that attach magnetically with magnets that are not visible.

BRIEF SUMMARY OF THE INVENTION

It is accordingly an object of the invention to provide eyeglasses with magnetic closure for holding interchangeable lenses, which overcome the above-mentioned disadvantages of the heretofore-known devices and methods of this general type.

With the foregoing and other objects in view there is provided, in accordance with the invention, an eyeframe for use with interchangeable lenspieces, i.e. interchangeable lenses and any surrounding rimwire. The eyeframe includes a rimwire and a closure. The closure is held magnetically closed. Interchangeable eyeglass lenses can be slid between the rimwire and the closure. The closure prevents the interchangeable lenses from unintentionally separating from the eyeframe. In an opened position, the closure allows the removal and interchanging of lenses. In a closed position, the closure prevents the lenses from being removed from the eyeframe. Because the closure is magnetic, the closure does not wear down with use. In addition, unlike mechanical snap closures, the magnetic closure according to the invention is operable with only enough force to overcome the magnets and (i.e. opened and closed) without the force that could crack the lenses.

The rimwire, similar to typical eyeglasses, forms two lens frames (i.e. loops) and a nose bridge interconnecting the two lens frames. A first magnetic fastener is connected to the rimwire, and more preferably to the nose bridge of the rimwire. The closure includes a second magnetic fastener. Both of the magnetic fasteners are made of magnetic material. At least one, and perhaps both, of the magnetic fasteners is a magnet. The magnetic fasteners attract each other and thereby attract the closure to the rimwire to sandwich the interchangeable lenspiece between the nose bridge and the rimwire, thereby holding it as long as the closure remains closed.

A rimlock may exist where two parts of the rimwire are joined. A rimlock is formed where two portions of a lens frame are connected typically by a screw through two threaded flanges. If a rimlock is present, the screw can be removed; the lens previously held by the now open lens frame can be exchanged. Rimlocks are typically located on the temple of the eyframes, where the stems connect to the lens frames.

The rimwire can include a brow bridge that interconnects the two lens frames. A closure hinge can be included to interconnect the brow bridge and the closure. The closure swings on the closure hinges between the open and closed position.

The rimwire may be "rimless". "Rimless" rimwires are in fact not truly rimless, they are semirimless. Rimless rimwires typically have a portion that is a traditional wire frame while the remainder is a thin, nearly invisible monofilament that sits in a groove formed along the edge of the lens. The monofilament is so narrow and nested that it is practically invisible and therefore appears "rimless".

Truly rimless (also known as three-piece mounts) eyeglasses can be utilized with the closure according to the invention to attach interchangeable lenspieces. In these rimless eyeglasses, the stems connect usually by screws) directly into the lens. A nose bridge is screwed into each lens to interconnect the lenses. As in other embodiments of eyeglasses, a closure according to the invention works can work in conjunction with the nose bride of the truly rimless eyeglasses to attach and detach interchangeable lenspieces.

In embodiments of rimwires having a nose bridge and a brow bridge, a trapezoid is defined within the rimwire. The closure can also be trapezoidal shape (formed by the closure nose bridge, the closure brow bridge, and the closure legs) and can be configured to overly the trapezoidal region of the eyeframe.

In embodiments having only a nose bridge (and no brow bridge), the closure is rectangular and overlies the brow bridge and lenspiece brow bridge.

To help support the lenses on the eyeframe, at least one prong can be attached to each lens frame to provide stability and balance. The auxiliary clip helps to support the interchangeable lenspiece on the eyeframe and provide balance and stability. A prong is soldered onto each temple of the interchangeable lenspiece. The prong abuts the stem of the eyeframe. If a rimlock is present, the prong can rest on the rimlock.

The nose bridge of the eyeframe and the nose bridge of the interchangeable lenspiece can include a pawl that mates with a respective slot. The pawl may be on the interchangeable lenspiece and the slot on the eyeframe, or vice versa. By making the pawl and slot any shape but round, the interchangeable lenspiece is prevented from rotating relative to the eyeframe.

The interchangeable lens of the interchangeable lenspiece may be a primary lens; i.e. no lenses are held in the underlying eyeframe. When the primary lens is interchangeable, different lenses can be used depending on the situation. For example, bifocals, progressive prescription lenses, sunglasses, reading glasses, or plano safety glasses can be interchanged. Thus, a system is created that allow a common eyeframe to be shared with various interchangeable lenspieces.

In addition, the interchangeable lens can be an auxiliary lens that overlies a primary lens held in the rimwire of the eyeframe. In the case of interchangeable auxiliary lenses, a primary lenses is permanently included within each lens frame. The advantage of this system is that a prescription lens can be the permanent primary lens. A group of exchangeable auxiliary lenses can be interchanged and combined with the primary lens to allow the eyeglasses to be adapted to different situations. For example, the primary lens can be a prescription lens and the interchangeable lens can be exchangeable to allow switching to a polarized lens auxiliary lens for fishing or an amber lens for skiing. Additional lifestyle lenses can be applied for such activities as flying, golfing, and hunting.

The invention provides a set of eyeglasses that can include lenses that are preferred or required for an occupation. The same frames can then be reused with different lenses for recreational use. By being usable for both occupational and recreational uses, the wearer can save the expense of having to buy two frames. Because the wearer only needs to buy one frame, instead of multiple frames, the wearer may be encouraged to pay more for the multiple-use frame.

In addition, a plurality of interchangeable lenses can be incorporated simultaneously. A first set of interchangeable lenses can be placed against the rim. A second set of interchangeable lenses are then added over the first set. Both interchangeable lenses would be held to the rimwire by the closure.

In accordance with a further object of the invention, the magnetic closure includes a slot and a pawl that seats in the slot to help the closure lock with the bridge. In particular, a slot can be formed in the nose bridge or the closure nose bride. A pawl that fits in the slot is placed in the other of the nose bridge or the closure nose bridge. The inclusion of a slot and pawl allows the closure to mechanically seat within the closure. This type of slot and pawl mechanical closure when combined with a magnetically closed bridge creates a very strong closure. Unlike purely magnetic closures, a magnetic-mechanical closure using a slot and pawl as well as magnets is wiggle free and prevents the bridge from moving slightly which can allow the interchangeable lens to jiggle.

In accordance with a further object of the invention, the bridge is held in a closed position by magnetic forces to the eyeframe. The magnetic closure is formed by two magnetic fasteners that are magnetically attracted to each other. Magnetic closure and magnetic fastener are broad terms meant to include any type of closures that utilize magnetic force to hold the bridge closed.

The magnetic closure can be formed by a magnetic fastener that is a permanent magnet and the other magnetic fastener is made from magnetic material (i.e. ferromagnetic or paramagnetic material) that can be magnetically attracted to the permanent magnetic fastener. Descriptions of magnetic materials are described in Serway, *Physics for Scientists and Engineers with Modern Physics,* 3d ed., Chapter 30, pp 835-873, which is incorporated into the specification by reference. The magnetic fastener that is a permanent magnet can be made from ferromagnetic material that has had its magnetic poles aligned. Examples of ferromagnetic materials iron, cobalt, nickel, gadolinium, and dysprosium.

The magnetic closure can also be made from two permanent magnetic fasteners. In this case, the magnetic poles of the permanent magnetic fasteners should be aligned to allow the two permanent magnetic fasteners to attract each other (and not repel each other).

While permanent ferromagnets are preferred, other magnets can be used in the magnetic closure. For example, the magnetic closure could include an electromagnet.

In accordance with a further object of the invention, the magnetic fasteners can be connected to the eyeframe, in particular the nose bridge, and to the closure. The magnetic fasteners may be cemented, welded, soldered, forged, or glued to the frame. This method of connecting the magnetic fastener is the least expensive but results in the magnetic fastener being visible when the closure is in an opened position.

The magnetic fasteners may be enclosed within the eyeframe. For example, the magnetic fasteners may be enclosed by having the eyeframe bent around the magnetic fastener. The magnetic fasteners can be embedded within the eyeframe and the closure by having the material of the eyeframe or closure formed around the magnetic fasteners. The magnetic fasteners still attract each other through the material of the eyeframe (i.e. the bridge) and the closure. The advantage of embedding the magnetic fastener within the frame is that it is not visible. Accordingly, the magnetic fasteners do not disturb the aesthetic properties of the frame.

In accordance with a further object of the invention, the eyeframe and closure themselves can be formed from magnetic material. For example, the bridge itself can be made of ferromagnetic or paramagnetic material. Likewise, the closure itself can be made of ferromagnetic or paramagnetic material. Then, as long as at least one of the bridge or the closure is magnetized to be a permanent magnet, it will attract the other. When either the eyeframe or bridge is made of magnetic material, the other can still use a magnetic material insert as well.

A further object of the invention is to provide eyeframes with an interchangeable lenspiece that attaches magnetically and has the magnets hidden so the magnets are not visible when the eyeglasses are worn.

Other features which are considered as characteristic for the invention are set forth in the appended claims.

Although the invention is illustrated and described herein as embodied in an eyeframe for use with interchangeable lenses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 5 is front side view of a second embodiment of the eyeframe, which has only a nose bridge, and of the interchangeable lens, a closure of the eyeframe is in an open position.

FIG. 6 is a front side view of the second embodiment of the eyeframe with the interchangeable lens engaging the eyeframe, the closure of the eyeframe is in an on open position.

FIG. 7 is a front side view of the second embodiment of the eyeframe with the interchangeable lens held by the closure, which is in a closed position.

FIG. 8 is a front perspective, partial view of a nose bridge of the second embodiment of the eyeframe, the nose bridge is in the open position, and a rear perspective, partial view of a nose bride of they interchangeable lens.

FIG. 9 is a rear side view of the nose bride of the second embodiment of the eyeframe, the nose bridge is in the closed position.

DETAILED DESCRIPTION OF THE INVENTION

Figure 1:
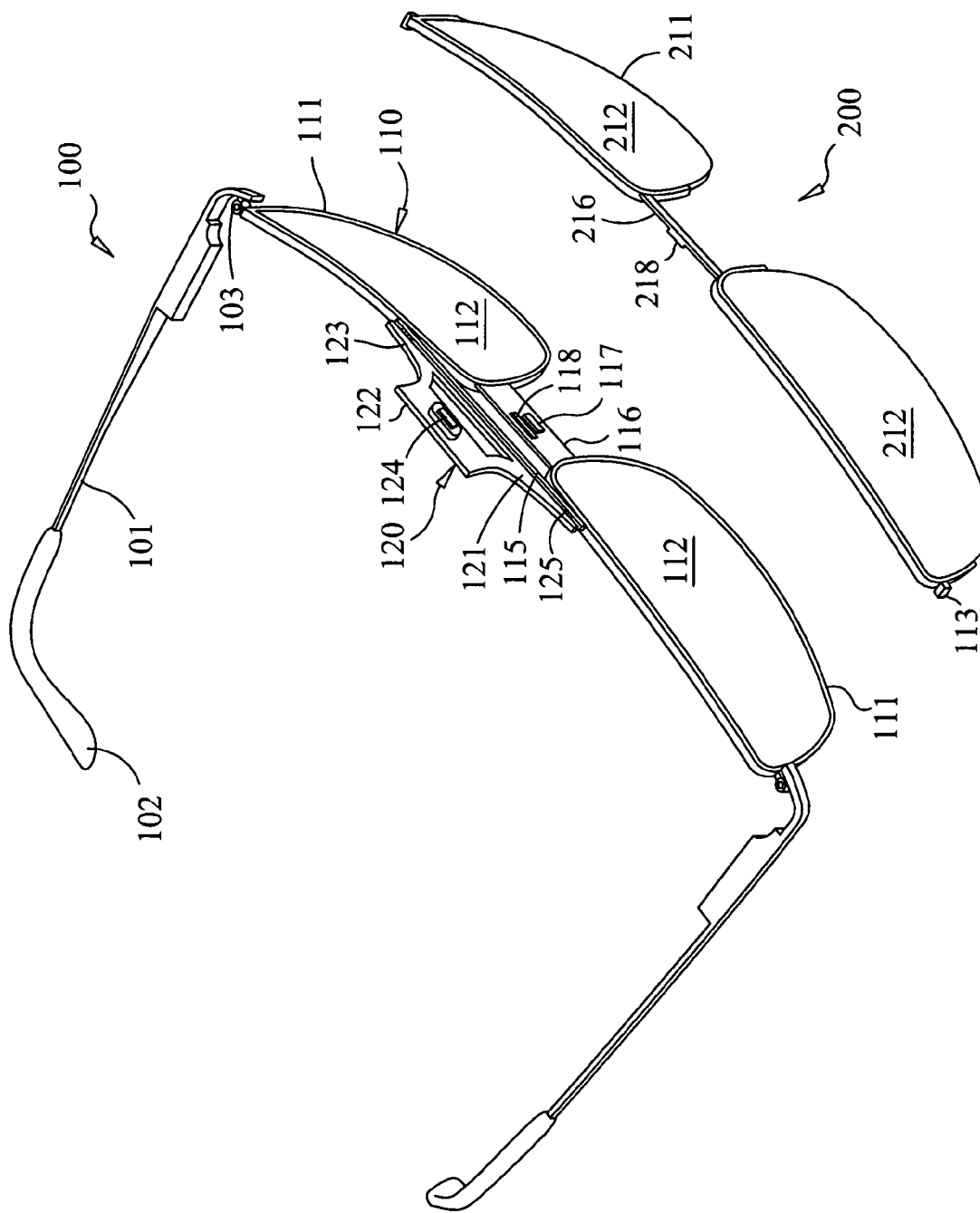
FIG. 1 is a diagrammatic front perspective view of a first embodiment of an eyeframe with a nose bridge and brow bridge and that is shown in an open position and an interchangeable lens, both according to the invention.

Referring now to the figures of the drawing in detail and first, particularly, to FIG. 1 thereof, there is seen an eyeframe that is generally marked with reference number 100. Like most eyeframes, the eyeframe 100 includes two stems 101. Each stem 101 has an earpad 102. Each stem 101 connects to a common rimwire 110 at a stem hinge 103.

The rimwire 110 is the front part of the eyeframe 100. The rimwire 110 forms two loops, which are lens frames 111. The lens frames 111 roughly overly a wearer's eye sockets when worn. The lens frames 111 are interconnected by a nose bridge 116. The nose bridge 111 overlies a wearer's nose when worn. In the embodiment shown in FIGS. 1-4, a brow bridge 115 additionally interconnects the lens frames 111 and is disposed parallel to the nose bridge 116. The brow bridge 115 overlies a wearer's brow ridge when worn.

The embodiment shown has two primary lenses 112, each held within a respective lens frame 111. The primary lenses 112 that are shown are permanent lenses. In this embodiment, the primary lenses 112 are prescription lenses. In other embodiments, the primary lenses 112 can be any type of lenses such as sunglasses, single vision, plano lenses, bifocal lenses, trifocal lenses, progressive lenses, or safety lenses.

In the embodiment shown, the nose bridge 116 has a slot 118 formed in the nose bridge 116. The slot 118 is a shaped cavity, which is configured to hold a male pawl 218 that is described in detail below. A first magnetic fastener 117 is connected to the nose bridge 116. The first magnetic fastener 117 is a permanent magnet made from iron, a ferromagnetic material. The first magnetic fastener 117 has a magnetic north pole that is aligned outward, perpendicular to a wearer's face.

A closure 120 is connected to the rimwire 110. The closure 120 is generally trapezoidal shaped. The closure 120 has a long closure brow bridge 121 and a shorter, parallel closure nose bridge 122. Closure legs 123 are curved and interconnect the closure brow bridge 121 and the closure nose bridge 122. The closure 120 is configured (i.e. shaped and sized) so the closure brow bridge 121 overlies the brow bridge 115, so the closure nose bridge 122 overlies the nose bridge 116, and so each of the closure legs 123 overlies at a part of a respective one of the lens frames 111.

Figure 3:
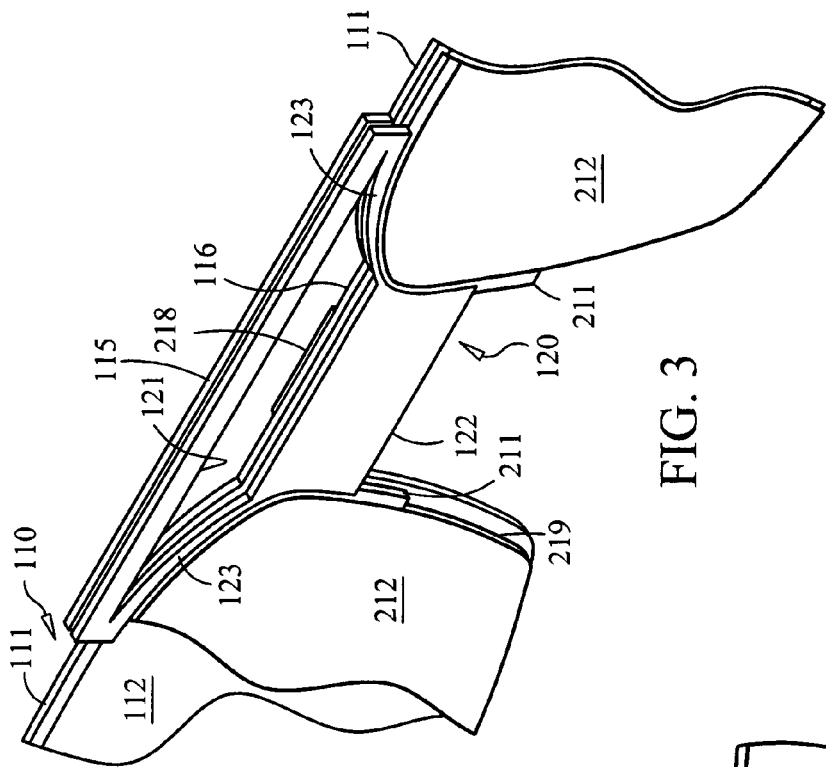
FIG. 3 is a partial, enlarged diagrammatic front perspective view of the first embodiment of the eyeframe shown in a closed position and holding the interchangeable lens.

A second magnetic fastener 124 is connected to the closure nose bridge 122. The second magnetic fastener 124 is configured to overlap the first magnetic fastener 117 when the closure 120 is in a closed position as shown in FIG. 3. In the embodiment shown, the second magnetic fastener 124 is a permanent magnet made from iron, a ferromagnetic material. In the embodiment shown, the magnetic north pole of the second magnetic fastener 124 is aligned with the magnetic north pole of the first magnetic fastener. That is, the magnetic north pole of the second magnetic fastener 124 is aligned outward and perpendicular to a wearer's face. This allows the second magnetic fastener 124 and the first magnetic fastener to be mutually attracted.

Figure 2:
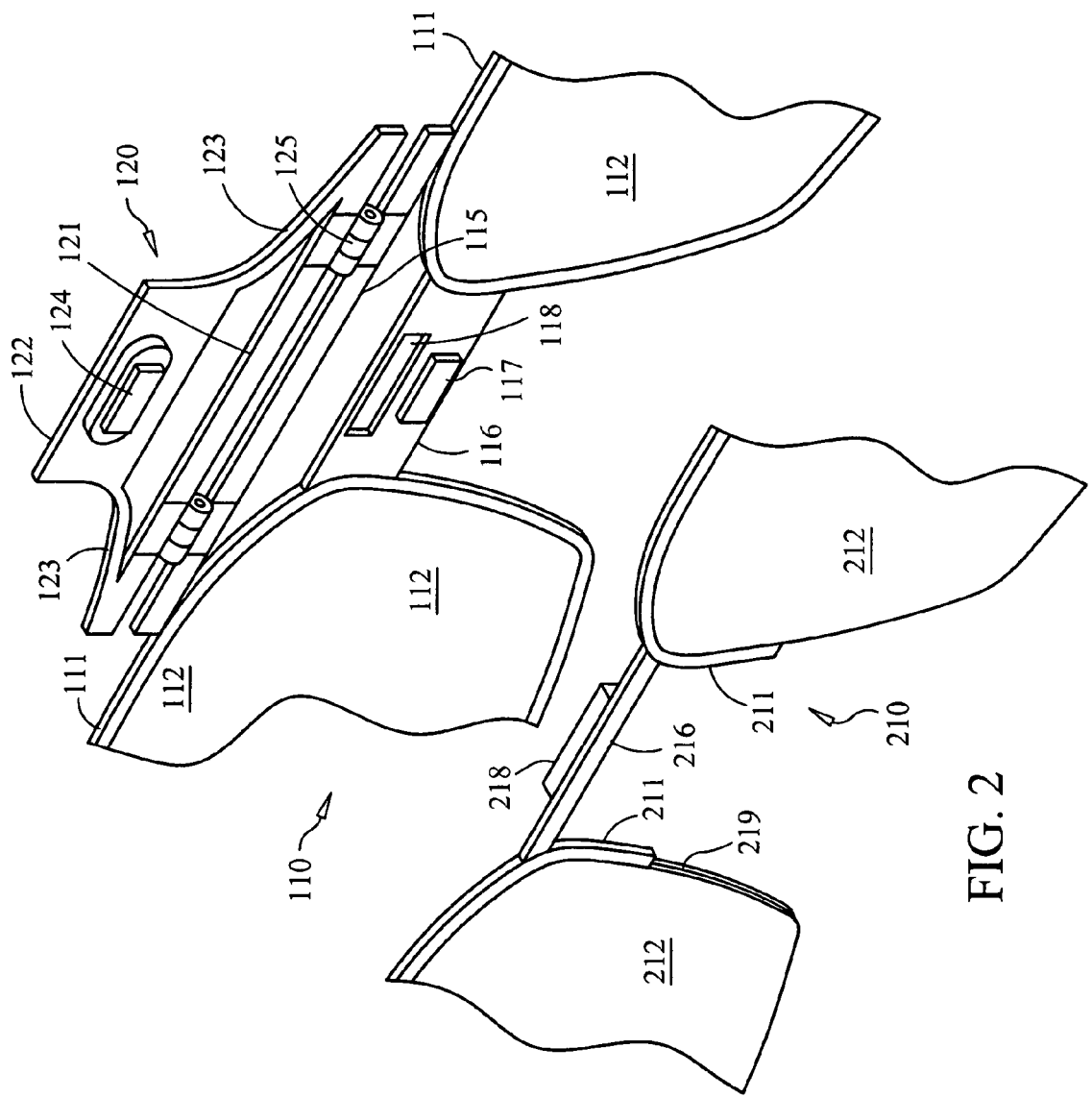
FIG. 2 is a partial, enlarged diagrammatic front perspective view of the first embodiment of the eyeframe in the opened position and the interchangeable lens.
Figure 4:
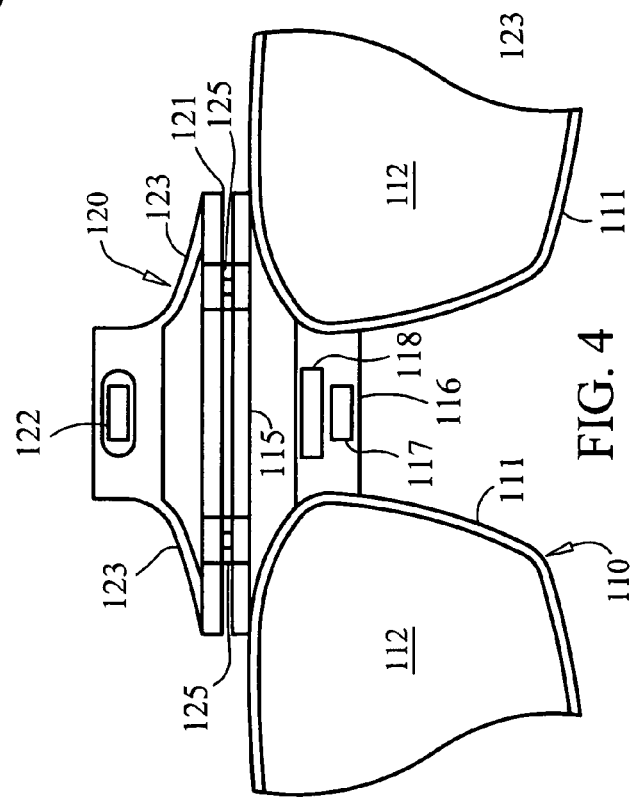
FIG. 4 is a partial, enlarged front view of the first embodiment of the eyeframe shown in the open position.

Closure hinges 125 connect the closure 120 to the rimwire 110. In particular, the hinges 125 connect the closure brow bridge 121 to the brow bridge 115. The hinges 125 permit the closure 120 to pivot between an open position as shown in FIGS. 1, 2, and 4 and a closed position as shown in FIG. 3.

An interchangeable lenspiece 200 includes a lens-piece rimwire 210. The lens-piece rimwire 210 forms two lens-piece lens frames 211 that are interconnected by a lens-piece nose bridge 216. The lens-piece lens frames 211 hold the lens-piece lenses 212. The interchangeable lenspiece 200 is roughly congruent to the rimwire 110. The term "roughly congruent" for purposes of this application means sized and shaped so the lens-piece lenses 212 overly the lens frames 111 when the lens-piece nose bridge 216 overlies nose bridge 116. In the preferred embodiment, the lens-piece lenses 212 are auxiliary lenses that augment the primary lenses 112. Preferably, the lens-piece lenses 212 are sunglass lenses. In other possible embodiments, the lens-piece lenses 212 can be reading lenses or prescription lenses.

A pawl 218 is attached to the lens-piece nose bridge 216 of the interchangeable lenspiece 200. The pawl 218 extends inward (i.e. toward a wearer's face) from the lens-piece nose bridge 216.

To attach the interchangeable lens-piece 200 to the eyeframe 100, the closure 120 is opened. To open the closure 120, the second magnetic fastener 124 is pried from the first magnetic fastener 117 and the closure 120 is opened by moving the closure relative to the rime wire 110 about the hinge 115. The interchangeable lenspiece 200 is then attached by inserting the pawl 218 into the slot 118. Next, the closure is closure 120 is closed by placing the second magnetic closure 124 against the first magnetic closure 117. The interchangeable lenspiece 200 is thereby sandwiched between the closure 120 and the rimwire 110. In particular, the lens-piece nose bridge 216 is sandwiched between nose bridge 116 and the closure nose bridge 122. The fit of the pawl 218 within the slot 118 prevents the interchangeable lenspiece 200 from jiggling relative to the eyeframe 100.

A preferred embodiment of a system of interchangeable lenses includes one eyeframe 100 and a plurality of different interchangeable lenspieces 200. The various different interchangeable lenspieces 200 can be attached and combined with the eyeframe 100 depending on the situation. For example, an interchangeable lenspiece 200 with amber-tinted lens-piece lenses 212 can be used for skiing. The amber-tinted lenses can be removed and interchanged with a different interchangeable lenspiece 200 containing polarized lens-piece lenses 212 for fishing, glare reduction, driving, skiing, and hunting.

FIGS. 5-9 show a second embodiment of the eyeframe 100, wherein the eyeframe 100 has a nose bridge 116, but no brow bridge 115. A slot 118 is formed within the nose bridge 116 in approximately the center of the nose bridge 116. A first magnetic fastener 117 is disposed on the nose bridge 116 lower than the slot 118.

In the second embodiment, the closure 120 is connected to the nose bridge 116 by the closure hinges 125. The closure 120 is roughly congruent with the nose bridge 116. A second magnetic fastener 124 is disposed on the inside bottom (bottom when closed, top when open) of the closure so as to overlap the first magnetic fastener 117 when the closure is closed. A lip 219 extends below the second magnetic fastener 124 and allows the closure 120 to be easily pried open.

An interchangeable lenspiece 200 of the second embodiment is similar to the interchangeable lenspiece 200 of the first embodiment. The interchangeable lenspiece 200 includes an interchangeable rimwire 210. The interchangeable rimwire 210 forms two interchangeable lens frame 211 that each hold a respective auxiliary lens 212. An interchangeable nose piece 216 interconnects the two interchangeable lens frames 211. A pawl 218 is connected to the interchangeable nose piece 216 and extends inward (i.e. toward a wearer's face). The pawl 218 complements the slot 118 and inserts into the slot. Preferably, the pawl 218 is rectangular and fits snugly within the slot 118; the rectangular shape prevents the pawl 218 and interchangeable lens 200 from rotating and jiggling relative to the eyeframe 100.

The closure hinge 125 is disposed behind the closure 120. By being behind the closure 120, the closure hinge 125 is not visible when the closure 120 is in a closed position. See FIG. 7.

The closure hinge 125 is disposed on the front, near the top of the nose bridge 116. The slot 118 is in the middle of the nose bridge 116. The interchangeable nose piece 216 should not overly the closure hinge 125; this configuration allows the closure to be as thin as possible. The first magnetic fastener 117 is near the bottom of the nose bridge 116.

To use the second embodiment of the invention, the closure 120 is opened as shown in FIG. 5. The pawl 218 of the interchangeable lenspiece 200 is inserted into the slot 118 in the nose bridge 116 as shown in FIG. 6. The closure 120 is then closed by rotating the closure 120 about the closure hinge 125 and bringing the first magnetic fastener 117 near the second magnetic fastener 124 as shown in FIG. 7. To open the closure 120, the closure is lifted by the lip 219.

I claim:

1. An eyeframe for use with interchangeable lenspieces, comprising:
   a bridge for supporting an interchangeable lenspiece and having a first magnetic fastener; and
   a closure at least partially releasably connected to said bridge and having a second magnetic fastener, said second magnetic fastener overlying said first magnetic fastener;
   said first magnetic fastener and said second magnetic fastener being magnetically attracted to each other;
   said bridge and said closure sandwiching and releasably holding the interchangeable lenspiece therebetween.

2. The eyeframe according to claim 1, wherein:
   said bridge is a nose bridge;
   said nose bridge is part of a rimwire;
   said rimwire forms two lens frames and said nose bridge interconnects said two lens frames; and
   said first magnetic fastener is disposed in said nose bridge.

3. The eyeframe according to claim 2, further comprising:
   a brow bridge of said rimwire; and
   a closure hinge interconnecting said brow bridge and said closure.

4. The eyeframe according to claim 3, wherein:
   said nose bridge is parallel to said brow bridge; and
   said closure is trapezoidal, said closure having a closure brow bridge, a closure nose bridge parallel to said brow bridge, and two closure legs each interconnecting said closure nose bridge and said closure brow bridge; and
   said closure overlies said nose bridge and said brow bridge.

5. The eyeframe according to claim 2, wherein:
   the interchangeable lenspiece is a primary lens; and
   said rimwire defines two lens frames supporting the interchangeable lenspiece.

6. The eyeframe according to claim 1, further comprising a closure hinge interconnecting said bridge and said closure.

7. The eyeframe according to claim 6, wherein said closure hinge is hidden by said closure when said closure is closed.

8. The eyeframe according to claim 6, wherein said closure hinge is disposed behind said closure when said closure is closed.

9. The eyeframe according to claim 6, wherein said closure hinge interconnects said nose bridge and said closure.

10. The eyeframe according to claim 9, wherein:
    said bridge is a nose bridge; and
    said closure is trapezoidal.

11. The eyeframe according to claim 1, wherein:
    said first magnetic fastener is a magnet; and
    said second magnetic fastener is made from a magnetic material.

12. The eyeframe according to claim 1, wherein:
    said first magnetic fastener is made from a magnetic material; and
    said second magnetic fastener is a magnet.

13. The eyeframe according to claim 1, wherein:
    said first magnetic fastener is a magnet having a pole pointing toward said second magnetic fastener; and
    said second magnetic fastener is a magnet having a pole aligned with said pole of said first magnetic fastener so said first magnetic fastener attracts said second magnetic fastener.

14. The eyeframe according to claim 1, further comprising a stem connected to said rimwire, said stem being usable for supporting a prong on the interchangeable lenspiece.

15. The eyeframe according to claim 1, further comprising a primary lens connected to and encircled by said rimwire and underlying the interchangeable lenspiece, the interchangeable lenspiece holding an auxiliary lens, said primary lens underlying the auxiliary lens.

16. The eyeframe according to claim 1, wherein:
    said bridge has a slot formed therein; and
    said closure has a pawl formed thereon, said pawl seating within said slot of said bridge when said closure is closed.

17. The eyeframe according to claim 1, wherein:
said closure has a slot formed therein; and
said bridge has a pawl formed thereon, said pawl seating within said slot of said closure when said closure is closed.

18. The eyeframe according to claim 1, wherein:
said first magnetic fastener is a magnet;
said closure is made from magnetic material;
said magnetic-material closure is said second magnetic fastener.

19. The eyeframe according to claim 1, wherein:
said second magnetic fastener is a magnet;
said bridge is made from magnetic material; and
said magnetic-material rimwire is said first magnetic fastener.

20. An eyeframe for holding interchangeable lenspieces, comprising:
an interchangeable lenspiece having two interchangeable lenses and a rimwire forming two interchangeable lens frames each holding a respective one of said two interchangeable lenses and an interchangeable lens nose bridge interconnecting said two interchangeable lens frames;
a rimwire defining two lens frames and underlying and supporting said interchangeable lenspiece when said interchangeable lenspiece is attached;
a horizontal nose bridge interconnecting said lens frames and having a first magnetic fastener connected to said nose bridge, said nose bridge overlying a nose of a wearer when worn;
a horizontal brow bridge interconnecting said lens frames and being parallel to said nose bridge, said brow bridge overlying a brow of the wearer when worn;
a trapezoidal closure having a closure nose bridge overlying said nose bridge when said closure is closed, a closure brow bridge overlying said brow bridge when said closure is closed, two closure legs interconnecting said closure nose bridge with said closure brow bridge and partially overlying said rimwire when said closure is closed, and a second magnetic fastener disposed in said closure nose bridge, overlying said first magnetic fastener, and magnetically releasably holding said closure closed, said closure folding over said interchangeable lenspiece and holding said interchangeable lenspiece on said rimwire when said closure is closed and releasing said interchangeable lenspiece when said closure is open; and
a closure hinge interconnecting said brow bridge and said closure brow bridge.

21. An eyeframe for holding interchangeable lenses, comprising:
an interchangeable lenspiece having two interchangeable lenses and a rimwire forming two interchangeable lens frames each holding a respective one of said two interchangeable lenses and an interchangeable lens nose bridge interconnecting said two interchangeable lens frames;
a rimwire defining two lens frames and underlying and supporting said interchangeable lenspiece when said interchangeable lenspiece is attached;
a horizontal nose bridge interconnecting said lens frames and having a first magnetic fastener connected to said nose bridge, said nose bridge overlying a nose of a wearer when worn;
a closure having a closure nose bridge overlying said nose bridge when said closure is closed and a second magnetic fastener disposed in said closure nose bridge, overlying said first magnetic fastener, and magnetically releasably holding said closure closed, said closure folding over said interchangeable lenspiece and holding said interchangeable lenspiece on said rimwire when said closure is closed and releasing said interchangeable lenspiece when said closure is open; and
a closure hinge interconnecting said nose bridge and said closure nose bridge.

22. An eyeframe for holding interchangeable lenses, comprising:
an interchangeable lenspiece;
a bridge for supporting said interchangeable lenspiece and having a first magnetic fastener; and
a closure releasably connected to said bridge and having a second magnetic fastener, said second ferromagnetic fastener overlying said first magnetic fastener;
said first ferromagnetic fastener and said second magnet fastener being magnetically attracted to each other;
said bridge and said closure sandwiching and releasably holding said interchangeable lenspiece therebetween.

23. The eyeframe according to claim 22, wherein said interchangeable lenspiece includes a rimwire holding at least one lens.

24. The eyeframe according to claim 23, wherein said lens is a prescription lens.

25. The eyeframe according to claim 23, wherein said lens is a sunglass lens.

26. The eyeframe according to claim 23, where said lens is a primary lens.

27. The eyeframe according to claim 23, wherein said lens is an auxiliary lens.

28. The eyeframe according to claim 22, wherein said interchangeable lenspiece includes two interchangeable lenses, an interchangeable lens wire formed into two interchangeable lens frames, each holding a respective one of said interchangeable lenses, and an interchangeable lens nose bridge interconnecting said interchangeable lens frames.

29. The eyeframe according to claim 28, wherein said interchangeable lens nose bridge is held by said closure when said closure is closed.

30. The eyeframe according to claim 29, wherein:
said nose bridge has a slot formed therein; and
said interchangeable lens nose bridge has a pawl, said pawl being insertable into said slot.

31. The eyeframe according to claim 29, wherein:
said interchangeable lens nose bridge has a slot formed therein; and
said nose bridge has a pawl, said pawl being insertable into said slot.

32. An interchangeable lens system for providing a plurality of interchangeable lenspieces with various looks and optical qualities, comprising:
a plurality of different interchangeable lenspieces;
an eyeframe for holding a given one of said interchangeable lenspieces at a time, said eyeframe including:
a bridge for supporting said given interchangeable lenspiece and having a first magnetic fastener; and
a closure at least partially releasably connected to said bridge and having a second magnetic fastener, said second magnetic fastener overlying said first ferromagnetic fastener;
said first magnetic fastener and said second magnet fastener being magnetically attracted to each other;
said bridge and said closure sandwiching and releasably holding said given interchangeable lenspiece therebetween.

* * * * *